United States Patent
Billiani et al.

(10) Patent No.: US 8,962,768 B2
(45) Date of Patent: Feb. 24, 2015

(54) CATIONIC ACRYLIC RESINS

(75) Inventors: Johann Billiani, Graz (AT); Roland Feola, Graz (AT); Willi Paar, Graz (AT)

(73) Assignee: Allnex Austria GmbH (AT)

( * ) Notice: Subject to any disclaimer, the term of this patent is extended or adjusted under 35 U.S.C. 154(b) by 118 days.

(21) Appl. No.: 13/580,052

(22) PCT Filed: Feb. 19, 2011

(86) PCT No.: PCT/EP2011/052476
§ 371 (c)(1),
(2), (4) Date: Sep. 20, 2012

(87) PCT Pub. No.: WO2011/101460
PCT Pub. Date: Aug. 25, 2011

(65) Prior Publication Data
US 2013/0005897 A1   Jan. 3, 2013

(30) Foreign Application Priority Data
Feb. 19, 2010 (EP) .................................. 10154073

(51) Int. Cl.
| | | |
|---|---|---|
| *C08G 65/331* | (2006.01) | |
| *C09D 163/02* | (2006.01) | |
| *C09D 163/04* | (2006.01) | |
| *C08G 59/18* | (2006.01) | |
| *C09D 5/02* | (2006.01) | |

(52) U.S. Cl.
CPC .............. *C08G 59/184* (2013.01); *C09D 5/022* (2013.01)
USPC ........... 525/385; 525/217; 525/218; 525/230; 524/555

(58) Field of Classification Search
USPC ................... 525/217, 218, 230, 385; 524/555
See application file for complete search history.

(56) References Cited

U.S. PATENT DOCUMENTS

| | | | | |
|---|---|---|---|---|
| 4,172,177 | A | * 10/1979 | Sato | ............................... 428/413 |
| 4,338,236 | A | 7/1982 | Hazan | |
| 4,383,058 | A | * 5/1983 | Tobias | ........................... 523/411 |
| 4,865,704 | A | 9/1989 | Saatweber et al. | |
| 5,164,430 | A | 11/1992 | Hattori et al. | |
| 5,272,188 | A | 12/1993 | Kriessmann et al. | |
| 5,296,525 | A | * 3/1994 | Spencer | ........................ 523/408 |
| 5,922,398 | A | 7/1999 | Hermes et al. | |
| 2002/0160202 | A1 | 10/2002 | Paar et al. | |

FOREIGN PATENT DOCUMENTS

| | | |
|---|---|---|
| EP | 0525695 A1 | 2/1993 |
| EP | 1233034 A1 | 8/2002 |
| JP | H03-074476 A | 3/1991 |

OTHER PUBLICATIONS

International Search Report for PCT/EP2011/052476 mailed Nov. 24, 2011.
International Written Opinion for PCT/EP2011/052476 mailed Nov. 24, 2011.

* cited by examiner

*Primary Examiner* — Satya Sastri
(74) *Attorney, Agent, or Firm* — Drinker Biddle & Reath LLP

(57) ABSTRACT

Reaction products AE of vinyl copolymers A having at least one functional group per molecule, with multifunctional compounds E derived from epoxide functional compounds having, on average, at least two functional groups per molecule, which reaction products AE have structural elements derived from ethylenically unsaturated monomers, and beta-hydroxy alkylene imine, $-NR-CH_2-CR'(OH)-$, or the corresponding ammonium structure, where R and R', independently from each other, stand for H or an alkyl group having from 1 to 8 carbon atoms, a process for their preparation, and a method of use thereof as binders for waterborne coating compositions.

15 Claims, No Drawings

CATIONIC ACRYLIC RESINS

RELATED APPLICATIONS

This application is a national stage application (under 35 U.S.C. § 371) of PCT/EP2011/052476, filed Feb. 19, 2011, which claims benefit of European Patent Application No. 10154073.0, filed Feb. 19, 2010.

FIELD OF THE INVENTION

The invention relates to cationic acrylic resins, a method of their preparation, and a method of use of these cationic acrylic resins as binders in waterborne coating compositions which provide good corrosion protection properties.

BACKGROUND OF THE INVENTION

Aqueous coating compositions containing a latex having chain-pendant amine functional groups have been known from U.S. Pat. No. 5,922,398. The amine-functionalised latices of this document may be prepared in accordance with any of a number of methods, including but not limited to addition polymerisation of ethylenically unsaturated monomers containing amine-functionality; polymerisation of monomers which readily generate amines by hydrolysis; reactions of aziridines with carboxyl group-containing polymers; reactions of polymers containing an enolic carbonyl group, e.g., acetoacetoxyethyl methacrylate and diamines; reactions of amines with epoxy-containing polymers; and reactions of amines with polymers of vinyl benzyl chloride.

Cationic acrylic resins have also been known from EP 0 525 695 A1. These resins are based on copolymers made from esters of acrylic or methacrylic acids having secondary or tertiary amino groups, monoesters of dihydric alcohols and acrylic or methacrylic acids, esters of monohydric alcohols and acrylic or methacrylic acids, and optionally, further vinyl monomers such as styrene.

These resins are made by radically initiated polymerisation in the presence of epoxy-amine adducts. The mixtures thus obtained are used as cathodically depositable paint binders.

Corrosion resistance of coatings prepared with these resins as binders is worse than the corrosion resistance of coatings prepared from pure epoxy-amine adducts. On the other hand, acrylic polymers are notable for their low propensity to yellowing and also, chalking, particularly when exposed to light.

On the other hand, epoxy resins, i. e., resins derived from at least difunctional epoxide group-containing compounds, and particularly, epoxy-amine adducts, provide very good corrosion resistance to coatings prepared therefrom, but suffer from yellowing and light-induced degradation.

SUMMARY OF THE INVENTION

It is therefore an object of the invention to provide acrylic-based coating compositions that have good light and UV resistance even without addition of UV absorbers, and also impart the notable good corrosion resistance known from epoxy resins to substrates made of base metals.

In the experiments underlying the present invention, it was found that chain extension of acrylic resins by reacting amino-functional acrylic copolymers with multifunctional epoxy compounds, or epoxide-functional acrylic resins with multifunctional amines, leads to high molar mass resins that form films even without addition of crosslinking compounds, and can be used to prepare coatings that impart good corrosion resistance and low propensity to degradation upon irradiation with light.

The invention therefore relates to reaction products AE of vinyl copolymers A having at least one functional group per molecule, with multifunctional compounds E derived from epoxide functional compounds having, on average, at least two functional groups per molecule, which reaction products AE have structural elements derived from ethylenically unsaturated monomers, and beta-hydroxy alkylene imine, —NR—$CH_2$—CR'(OH)—, or the corresponding ammonium structure, where R and R', independently from each other, stand for H or an alkyl group having from 1 to 8 carbon atoms.

These reaction products AE may be made by reaction of amino-functional vinyl copolymers Aa with multifunctional epoxide compounds Ee having, on average, at least two epoxide groups per molecule, and, in the alternative, by reaction of epoxy-functional vinyl copolymers Ae and amino-functional epoxy-amine adducts Ea having, on average, at least two amino groups per molecule, which reaction products AE have structural elements derived from ethylenically unsaturated monomers, and beta-hydroxy alkylene imine, —NR—$CH_2$—CR'(OH)—, or the corresponding ammonium structure, if a tertiary amine is reacted with an epoxide-functional compound, where R and R', independently from each other, stand for H or an alkyl group having from 1 to 8 carbon atoms.

The invention also relates to a process of making the reaction products AE by reacting amino-functional vinyl copolymers Aa with multifunctional epoxy compounds Ee having, on average, at least two epoxide groups per molecule.

The invention further relates to a process of making the reaction products AE by reacting epoxy-functional vinyl copolymers Ae and amino-functional epoxy-amine adducts Ea having, on average, at least two amino groups per molecule.

The invention also relates to a method of use of the reaction products AE as binders in aqueous coating compositions that are applied to a substrate, and provide the said substrate with a coating film that shows little or no degradation upon irradiation with visible light or UV light, and which impart good corrosion resistance to the coated substrate.

DETAILED DESCRIPTION OF THE PREFERRED EMBODIMENTS

In the context of the present invention, a vinyl copolymer is a polymer made from at least two different ethylenically unsaturated monomers, also referred to as "vinyl monomers". Molecules are called "multifunctional" if they have two or more of a specific kind of functional groups. Therefore, a multifunctional epoxide compound has at least two epoxide groups per molecule, and a multifunctional amine has at least two amino groups per molecule.

In one embodiment, the reaction products AE comprise structural moieties derived from vinyl copolymers Aa having functional amino groups, and from multifunctional epoxide compounds Ee having, on average, at least two epoxide groups per molecule.

In another embodiment, the reaction products AE comprise structural moieties derived from vinyl copolymers Ae having at least one epoxide group per molecule, and from multifunctional epoxy-amine adducts Ea having, on average, at least two amino groups per molecule.

The amino-functional vinyl copolymers Aa are polymers from at least three different kinds of ethylenically unsaturated monomers, at least one of which referred to as A1s has at least one secondary amino group per molecule, at least one of which referred to as A1t has at least one tertiary amino group per molecule, and at least one ethylenically unsaturated monomer A2 which does not have amino groups, which monomers A2 are selected from the group consisting of acidic vinyl monomers A20 having at least one acid group, preferably a carboxylic or sulphonic acid group, and an alkene group having from 2 to 10 carbon atoms, preferably monocarboxylic acids and dicarboxylic acids and their $C_1$- to $C_{25}$- alkyl half esters, preferred monomers A20 being acrylic and methacrylic acid, vinyl acetic acid, and crotonic and isocrotonic acids, maleic and fumaric acids, monoalkyl esters of olefinically unsaturated dicarboxylic acids such as monomethyl and monoethyl maleinate or the corresponding fumarates, itaconates, mesaconates, and citraconates; alkyl esters A21 of olefinically unsaturated carboxylic acids, which are esters of an aliphatic linear, branched or cyclic monohydric alcohol having up to 25 carbon atoms per molecule, wherein methylene groups may be replaced by an oxygen atom, with the proviso that two oxygen atoms may not be directly bound to each other, and an olefinically unsaturated carboxylic acid having from 3 to 20 carbon atoms, preferably alkyl (meth) acrylates which are esters of (meth)acrylic acid with the said alcohols; hydroxyalkyl esters A22 of olefinically unsaturated carboxylic acids which are esters of olefinically unsaturated carboxylic acids having from 4 to 20 carbon atoms and an aliphatic linear, branched or cyclic dihydric or polyhydric alcohol having up to 25 carbon atoms per molecule, wherein methylene groups may be replaced by an oxygen atom, with the proviso that two oxygen atoms may not be directly bound to each other, preferably hydroxyalkyl (meth)acrylates which are esters of (meth)acrylic acid with the said dihydric or polyhydric alcohols; vinyl ethers A23 of olefinically unsaturated alcohols, preferably vinyl and allyl and methallyl alcohols, and the monohydric alcohols mentioned under A21; vinyl halogenides A24 which may preferably be chloro- and bromo-substituted alkenes having from 2 to 20 carbon atoms, preferably vinyl chloride, vinyl bromide, allyl chloride and bromide, and methallyl chloride and bromide, and vinylidene chloride and bromide; vinyl nitriles A25, preferably acrylonitrile, methacrylonitrile, fumaric and maleic dinitriles; vinyl esters A26 which are esters of vinyl alcohol and linear, branched or cyclic aliphatic monocarboxylic acids having up to 25 carbon atoms, preferably the acetate, propionate, isooctanoate, and neodecanaote (2,2-dimethyloctanoate); vinyl ketones A27 having a total of from 4 to 20 carbon atoms such as methyl, ethyl, butyl, and decyl vinyl ketone; unsaturated aliphatic linear or branched alcohols A28 such as allyl and methallyl alcohol; and vinyl aromatics A29 such as styrene, vinyl naphthalene, and vinyl toluene where that latter two may be chosen from individual compounds such as 2- and 4-vinyl toluene, and 1- and 2-vinyl naphthalene, or the mixtures of the said isomers. The amino-functional vinyl polymers Aa preferably have at least one amino group per molecule, on average.

The amino group-containing vinyl monomers A1s have secondary amino groups, and the amino group-containing vinyl monomers A1t have tertiary amino groups, or both secondary and tertiary amino groups. Particularly preferred are such monomers A1s that have secondary amino groups which are in the neighbourhood of bulky substituents like a tert.-butyl group or a 3-pentyl group which renders a Michael addition under polymerisation conditions less favourable, such as tert.-butylaminoethyl (meth)acrylate. Other preferred monomers A1t having tertiary amino groups are preferably dialkylamino-alkyl (meth)acrylates such as diethylaminoethyl (meth)acrylate, and dimethylaminoethyl (meth)acrylate, preferred is dimethylaminoethyl methacrylate. It is also possible to generate the amine functionality from a vinyl monomer A20 having an acid group which is copolymerised, and thereafter, in a polymer analogue reaction, is converted to amine functionality by reaction with an aziridine, or from a vinyl ketone monomer A27 which is copolymerised and thereafter, in a polymer analogue reaction, is reacted with a diamine. It has been found in the experiments underlying the invention that the presence of a mass fraction of at least 2%, more preferred at least 5%, and preferably, not more than 20%, of ethylenically unsaturated monomers A1t having tertiary amino groups in the monomer mixture used to prepare amino-functional vinyl copolymers improves the corrosion protection properties of coatings made with the use of such amino-functional vinyl copolymers as binder components. The mass fraction has its usual meaning of the ratio of the mass of monomers A1t, and the sum of the masses of all monomers upon which the copolymer is based.

The expression "(meth)acrylic acid" stands for one or both of acrylic acid and methacrylic acid. Likewise, "(meth)acrylate" stands for one or both of acrylate and methacrylate. An alcohol or phenol is said to be monohydric if it has exactly one hydroxyl group per molecule. An alcohol or a phenol is said to be dihydric if it has exactly two hydroxyl groups per molecule. An alcohol or a phenol is said to be polyhydric if it has more than two hydroxyl groups per molecule. As is common in the field, alcohols are organic hydroxy-functional compounds where the carbon atom carrying the hydroxyl group is an aliphatic carbon atom. Likewise, phenols are organic hydroxy-functional compounds where the carbon atom carrying the hydroxyl group is an aromatic carbon atom. An acid is said to be dibasic if it has exactly two acidic hydrogen atoms per molecule. An acid is said to be polybasic if it has more than two acidic hydrogen atoms per molecule.

The multifunctional epoxide compounds Ee having, on average, at least two epoxide groups per molecule, are preferably selected from the group consisting of ethers of glycidyl alcohol with dihydric or polyhydric alcohols or dihydric or polyhydric phenols, esters of glycidyl alcohol with dibasic or polybasic acids, and linear or branched diepoxy alkanes having exactly two epoxide groups per molecule, or polyepoxy alkanes having more than two epoxide groups per molecule. Instead of glycidyl alcohol, or in mixture with it, 2-methylglycidol may also be used. The best corrosion resistance is realised when ethers of glycidyl alcohol with dihydric phenols are used, particularly the diglycidyl ethers of bisphenol A and bisphenol F, alone or in mixture. Other examples of useful substances are glycidyl diesters of adipic and glutaric acid, and of dimeric fatty acids, and diepoxy alkanes such as 1,2,5,6-diepoxyhexane or 1,2,5,6-diepoxycyclooctane, 3,4-epoxycyclohexane carboxylic acid (3,4-epoxycyclohexylmethyl) ester, and the diglycidyl ester of hexahydrophthalic acid.

It is also possible to use oligomeric or polymeric epoxide compounds as epoxide compounds Ee, such as the known so-called epoxy resins having at least two epoxide groups per molecule, which may be reaction products of dihydric alcohols such as oligomeric or polymeric oxyalkylene glycols, preferably polypropyplene glycol, or phenols such as bisphenol A or bisphenol F, with diepoxide compounds such as bisglycidyl ethers of dihydric alcohols or of dihydric phenols, and also, the well-known epoxy resins based on novolaks. Particularly preferred because of the good corrosion resistance of coating compositions prepared therefrom are epoxy resins based on bisphenol A and bisphenol F, and of mixtures of both.

The epoxy-functional vinyl copolymers Ae comprise copolymers of at least one of the monomers A2 as specified supra, and at least one epoxy-functional olefinically unsaturated monomer A3 which may be an ether A31 of a hydroxy-functional vinyl monomer such as vinyl, allyl, and methallyl alcohol or of one of the olefinically unsaturated monomers A22 having hydroxyalkyl groups, preferably hydroxyethyl or hydroxypropyl (meth)acrylate, with glycidol or 2-methyl glycidol, or an ester of glycidol or 2-methyl glycidol and an acid-functional vinyl monomer A20 which is preferably an olefinically unsaturated aliphatic carboxylic acid having from three to twelve carbon atoms or an $C_1$- to $C_6$-alkyl half ester of an olefinically unsaturated dicarboxylic acid having from four to twelve carbon atoms. Preferred monomers A20 are acrylic and methacrylic acid, vinyl acetic acid, and crotonic and isocrotonic acids, and monomethyl and monoethyl maleinate or the corresponding fumarates, itaconates, mesaconates, and citraconates. Other useful epoxide-group containing monomers are olefinically unsaturated monoepoxides A32 derived from aliphatic dienes, particularly alpha-omega-dienes having from four to sixteen carbon atoms, such as 1,2-epoxy-3-butene, 1,2-epoxy-5-hexene, 1,2-epoxy-7-octene, and 1,2-epoxy-9-decene.

The amino-functional epoxy-amine adducts Ea have, on average, at least two amino groups per molecule and are derived from aromatic or aliphatic epoxide compounds E1 having at least two epoxide groups per molecule, and aliphatic or araliphatic amines E2 having at least one primary or secondary amino group per molecule. The amounts of E1 and E2 are preferably chosen such that the sum of the amount of substance n(OH) of hydroxyl groups and the amount of substance n(NH) of primary and secondary amino groups in the adduct Ea made from E1 and E2 that are reactive toward epoxide groups to the amount of substance of epoxide groups remaining in Ea is at least 1 mol/mol, preferably at least 10 mol/mol and particularly preferably, at least 20 mol/mol. Similarly, the amino-functional epoxy-amine adducts Ea may also have tertiary amino groups which react with epoxide-functional compounds under formation of an ammonium structure.

Araliphatic amines are such amines that have both aromatic and aliphatic carbon atoms, and where the amino group(s) are exclusively bound to aliphatic carbon atoms, and not directly connected to aromatic carbon atoms. Preferred among the amines E2 are amines E21 have at least one primary amino group, and optionally, also tertiary amino groups. It is also preferred to use such amines E21 in mixture with further amines E22 that do not have primary amino groups, and preferably also no tertiary amino groups. The amines E22 have secondary amino groups, and optionally, also one or more hydroxyl groups. When E2 is used to refer to the amines, this stands for the combined amount of amines E21 and amines E22.

In a preferred embodiment, the epoxide-functional compounds E1 are first reacted with amines E22, and then, with amines E21. This stepwise reaction is preferably conducted in a way that between 30% and 70% of the epoxide groups of E1 are consumed by reaction with amines E22, and in the second step, the remainder of the epoxide groups, i.e. to a total of at least 90%, and preferably, at least 95%, of the epoxide groups originally present in E1, is consumed by addition to the epoxide groups of the amino compounds E2.

Preferred epoxide compounds E1 are those mentioned supra under Ee, particularly epoxy resins derived from bisphenol A, bisphenol F, and mixtures thereof, and also, epoxy resins based on novolaks.

Among the amines E2, preferred amines E21 are those having at least one primary amino group per molecule, and optionally, also secondary or tertiary amino groups, or both secondary and tertiary amino groups, in addition to the at least one primary amino group per molecule, and from two to forty carbon atoms. Diamines and triamines having two or three primary amino groups are preferred, such as ethylene diamine, diethylene triamine, triethylene tetramine, and higher oligomeric diamino ethylene imines, 1,2- and 1,3-propylene diamine, 1,4-diaminobutane, 1,6-diaminohexane, bis-4-aminobutylamine, N,N'-bis(4-aminobutyl)-1,4-diaminobutane, m-xylylene diamine, isophorone diamine, and the isomeric cyclohexane diamines. Amines E21 having both primary and tertiary amino groups are 3-dimethylaminopropylamine, 2-dimethylaminoethylamine, 4-amino-1-methylpiperidine, N-(2-aminoethyl)morpholine, and N-(3-aminopropyl)morpholine.

Among the amines E2, preferred secondary amines E22 are diethanolamine, dipropanolamine, N,N'-bis-(2-hydroxyethyl) ethylene diamine, piperidine, piperazine and 4-piperazino-piperazine.

The reaction products are preferably made by separately synthesising the components Aa and Ee, in the first alternative, or by separately synthesising the components Ae and Ea, in the second alternative.

The polymers Aa and Ae can each be made by radically initiated solution polymerisation, using radical initiators that are soluble in the solvent used, or by emulsion polymerisation in the presence of an emulsifier. A solution polymer is preferably emulsified in water before reaction thereof with the proper component, Ee for polymer Aa, and Ea for polymer Ae. Emulsification may be effected by at least partial neutralisation if the polymer has ionogenic groups such as acid groups or basic amino groups, referred to as internal emulsification, or by addition of an emulsifier such as a soap (anionic emulsifier), an alkyl phenol ethoxylate or a fatty acid ethoxylate (nonionic emulsifiers) or an aliphatic long chain amino compound which has preferably quaternary ammonium groups (cationic emulsifier). Mixtures of non-ionic emulsifiers with anionic or with cationic emulsifiers may also preferably be used.

The polymers Aa or Ae may be reacted with the corresponding compounds Ee or Ea in bulk, if Ee or Ea are used as liquids or as low-melting compounds having a viscosity at the reaction temperature of not more than 1500 mPa·s. The compounds Ee or Ea are charged, and the polymers Aa or Ae are added under mixing conditions, and with temperature control. Solvents that are inert in the reaction between epoxide groups, on the one hand, and amino groups or hydroxyl groups, on the other hand, may be added to adjust the viscosity should this be needed, particularly when and during admixing the polymers Aa or Ae. The reaction temperature to form AE is preferably between 20° C. and 100° C., particularly from 30° C. to 80° C. Progress of the reaction is monitored by taking samples from the reaction mixture and measuring the consumption of epoxide groups, or of amino groups.

It is also possible to conduct the reaction of the polymers Aa or Ae and the compounds Ee or Ea in the form of their aqueous dispersions, which eliminates the need to add solvents. In this case, it is preferred to provide an aqueous dispersion of the polymers Aa or Ae, and to add the compounds Ee or Ea under stirring to form a dispersion of the reaction product AE. The reaction temperature and method to monitor is chosen in the same way as supra.

The aqueous dispersions of the reaction products AE can be used to formulate coating compositions, particularly on base metals, and also on other substrates such as plastics, glass, wood and wood-based materials, paper, cardboard, and mineral substrates such as concrete, stone, plaster, masonry and dry walls.

Coatings prepared from these aqueous dispersions provide good corrosion resistance, have a low propensity to yellowing and chalking, and can be used as primers particularly on base metals or wood, or as monocoats.

They are particularly preferred for coating of wood and wood materials as they provide an effective tannin barrier. As a primer applied on masonry or on dry walls, they provide an effective protective layer against tar and other condensates from cigarette smoke.

Although film formation occurs already without addition of curing agents, curing agents which can be used in combination with hydroxy functional binders, such as multi-functional isocyanates, capped multifunctional isocyanates, phenol-formaldehyde resin crosslinkers and aminoplast crosslinkers, can be added and generally increase the curing speed. The customary catalysts may also be used. Coating formulations prepared from the dispersions of AE may also comprise the customary additives such as wetting agents, levelling agents, defoamers, pigments, settling agents, sag control agents, and biocides.

EXAMPLES

The following examples are provided to further explain the invention, and shall not be construed as limiting.

In the examples and in the specification, concentrations stated with the unit "%" are mass fractions $w_L$ of solute L in the solution S, calculated as the ratio of the mass $m_L$ of solute and the mass $m_S$ of the solution.

The acid number is defined, according to DIN EN ISO 3682 (DIN 53 402), as the ratio of that mass $m_{KOH}$ of potassium hydroxide which is needed to neutralise the sample under examination, and the mass $m_B$ of this sample, or the mass of the solids in the sample in the case of a solution or dispersion; its customary unit is "mg/g".

Example 1

A solution polymerisation was conducted by adding into a polymerisation vessel charging with 400 g of methoxypropanol and heated to 120° C., under a nitrogen blanket, a first mixture of 200 g of n-butylacrylate, 450 g of methyl methacrylate, 180 g of 4-hydroxybutyl acrylate, 100 g of N-tert.-butylaminoethyl methacrylate, and 100 g of N,N-dimethylaminoethyl methacrylate, and as a second mixture, a solution of 30 g azobis-isovaleronitrile in 100 g of methoxypropanol, over a period of five hours under constant stirring and temperature control. After the said five hours, a further portion of initiator solution (4 g of tert-butyl peroctoate dissolved in 80 g of methoxypropanol) was added, in three equal portions within thirty minutes. The reaction solution was kept at 120° C. for a further ninety minutes, and then cooled. A sample drawn from the reaction vessel had a mass fraction of solids of 64.1%, a dynamic viscosity determined according to DIN EN ISO 3219, of 4700 mPa·s, and a Staudinger index of 9.2 cm³/g, measured in chloroform as solvent, at 23° C. It acid number was determined to be 2.7 mg/g. Its average molar mass, measured via GPC calibrated with styrene standards, was 14 kg/mol.

Example 2

1614 g of the polymer solution of Example 1 were filled into a rotary distillation apparatus, and the solvent was stripped off under reduced pressure until a mass fraction of solids of approximately 90% was reached. Cooling of the still was effected by adding a total of 50 g of deionised water during distillation. After 496 g of distillate had been collected, 56 g of a 50% strength aqueous solution of lactic acid were added during ten minutes at 95° C., and the neutralised resin was then slowly dispersed under good stirring in 1500 g of deionised water. Further 225 g of water were added to set the mass fraction of solids to approximately 36%. The resultant dispersion had a dynamic viscosity of 500 mPa·s at 23° C. On a sample drawn, the mass fraction of solids was determined to be 36.7%, measured by weighing the residue after drying a 800 mg sample at 120° C. for ten minutes.

Example 3

The neutralised polymer dispersion of Example 2 was charged into a reaction vessel and heated to 75° C. under stirring. 80 g of bisphenol A diglycidyl ether were added under stirring and at constant temperature. The reaction mixture was stirred for four more hours. The molar mass of the adduct could not be determined due to the insolubility of the dispersed resin. The mass fraction of solids of the adduct dispersion was adjusted with deionised water to 33%. The average particle size of the dispersion was determined according to ISO 13321, the result was 151 nm for the harmonic intensity-averaged particle diameter.

Example 4

A mixture was prepared of 88 g of desalinated water, 22 g of a dispersant (®Additol VXW 6208, Cytec Austria GmbH), 3 g of a defoamer (®Surfynol SE-F, E. I. DuPont de Nemours & Co.), 3 g of an acrylate thickening agent (®Acrysol RM 8/12 WA, Rohm & Haas), and 6 g of a thixotropy agent (®Luwothix HT, Lehmann & Voss & Co.). 62 g of an iron oxide pigment (®Bayferrox, Bayer Material Science AG), 106 g of a zinc phosphate pigment (Heucophos ZPO, Heubach GmbH), 55 g of a kaolin GASP 600, Engelhardt), and 55 g of a talc (®Talkum AT1, Norwegian Talc) were dispersed in the said mixture. Then, 480 g of the adduct dispersion of Example 3 were added together with further 117 g of desalinated water. The aqueous primer thus obtained had an efflux time (4 mm cup, DIN EN ISO 2431) of about 30 s. This primer was tested against the primer of example 2 of EP 1 233 034 A1, using the same setup and test method, viz. applying to untreated iron sheets with a dry film thickness of 30 μm. After drying for ten days at room temperature, a corrosion test was conducted according to DIN 50021. It was found that while both iron sheets remained uncorroded for 400 h, there were signs of corrosion at 600 h for the comparative primer of example 2 of EP 1 233 034 A1, rated "0" according to the rules of DIN 50021, while no corrosion was detected in the sheet coated with the primer of example 3 according to the invention (rating of "+"). No yellowing nor chalking was detectable upon exposure to the QUVB test after 200 h for a sheet coated with the primer of Example 4, while a further iron sheet coated with the comparative primer of example 2 of EP 1 233 034 A1 showed marked yellowing and also, chalking of the coated surface.

The reaction products AE according to the invention are distinguished over a system of the prior art therefore in both better corrosion resistance, and lower propensity to yellowing and chalking.

The invention claimed is:
1. A reaction product AE of vinyl copolymers A wherein the vinyl copolymers A are polymers Aa having functional secondary amino groups and functional tertiary amino groups, with multifunctional compounds E wherein the multifunctional compounds E are epoxide functional compounds Ee and have, on average, at least two epoxide groups per molecule, which reaction product AE has structural elements derived from ethylenically unsaturated monomers, and beta-hydroxy alkylene imine, —NR—$CH_2$—CR'(OH)—, or the corresponding ammonium structure, where R and R', independently from each other, stand for H or an alkyl group having from 1 to 8 carbon atoms.

2. The reaction product of claim 1, wherein the aminofunctional vinyl copolymers Aa are polymers from at least three different kinds of ethylenically unsaturated monomers, at least one of which referred to as A1s has at least one secondary amino group per molecule, at least one of which referred to as A1t has at least one tertiary amino group per molecule, and at least one ethylenically unsaturated monomer A2 which does not have amino groups selected from the group consisting of acid-functional vinyl monomers A20 which are olefinically unsaturated aliphatic carboxylic acids having from three to twelve carbon atoms or C1- to C6-alkyl half esters of olefinically unsaturated dicarboxylic acids having from four to twelve carbon atoms, alkyl (meth)acrylates A21 which are esters of (meth)acrylic acid and an aliphatic linear, branched or cyclic monohydric alcohol having up to 25 carbon atoms per molecule, hydroxyalkyl (meth)acrylates A22 which are esters of (meth)acrylic acid and an aliphatic linear, branched or cyclic dihydric or polyhydric alcohol having up to 25 carbon atoms per molecule, vinyl ethers A23, vinyl halogenides A24, vinyl nitriles A25, vinyl esters A26 which are esters of vinyl alcohol and linear, branched or cyclic aliphatic monocarboxylic acids having up to 25 carbon atoms, vinyl ketones A27, unsaturated aliphatic linear or branched alcohols A28 and vinyl aromatics A29 selected from the group consisting of styrene, vinyl toluene, and vinyl naphthalene, and the mixtures of isomers of these.

3. The reaction product of claim 1, wherein the unsaturated aliphatic linear or branched alcohols A28 are allyl alcohol or methallyl alcohol.

4. The reaction product of claim 1, wherein the multifunctional epoxide compounds Ee have, on average, at least two epoxide groups per molecule, and are selected from the group consisting of ethers of glycidyl alcohol and/or 2-methylglycidol with dihydric or polyhydric alcohols or dihydric or polyhydric phenols, esters of glycidyl alcohol and/or 2-methylglycidol with dibasic or polybasic acids, and linear or branched diepoxy alkanes having exactly two epoxide groups per molecule, and polyepoxy alkanes having more than two epoxide groups per molecule.

5. The reaction product of claim 1, wherein the oligomeric or polymeric epoxide compounds are used as epoxide compounds Ee, which are selected from the group consisting of epoxy resins having at least two epoxide groups per molecule, which are reaction products of dihydric and/or polyhydric alcohols including oligomeric or polymeric oxyalkylene glycols, dihydric and/or polyhydric phenols, with diepoxide or polyepoxide compounds selected from the group consisting of glycidyl ethers of dihydric and/or polyhydric alcohols or of dihydric and/or polyhydric phenols, and also epoxy resins based on novolaks.

6. A reaction product AE of vinyl copolymers A wherein the vinyl copolymers A are polymers Ae having at least one epoxide group per molecule, with multifunctional compounds E, wherein the multifunctional compounds E are amino-functional epoxy-amine adducts Ea having, on average, at least two amino groups per molecule, which reaction product AE has structural elements derived from ethylenically unsaturated monomers, and beta-hydroxy alkylene imine, —NR—$CH_2$—CR'(OH)—, or the corresponding ammonium structure, where R and R', independently from each other, stand for H or an alkyl group having from 1 to 8 carbon atoms.

7. The reaction product of claim 6, wherein the epoxy-functional vinyl copolymers Ae comprise copolymers of at least one of the monomers A2 which does not have amino groups selected from the group consisting of alkyl (meth)acrylates A21 which are esters of (meth)acrylic acid and an aliphatic linear, branched or cyclic monohydric alcohol having up to 25 carbon atoms per molecule, hydroxyalkyl (meth)acrylates A22 which are esters of (meth)acrylic acid and an aliphatic linear, branched or cyclic dihydric or polyhydric alcohol having up to 25 carbon atoms per molecule, vinyl ethers A23, vinyl halogenides A24, vinyl nitriles A25, vinyl esters A26 which are esters of vinyl alcohol and linear, branched or cyclic aliphatic monocarboxylic acids having up to 25 carbon atoms, vinyl ketones A27, unsaturated aliphatic linear or branched alcohols A28, and vinyl aromatics A29 and at least one epoxy-functional olefinically unsaturated monomer A3 selected from the group consisting of ethers of a hydroxy-functional vinyl monomer A22 with glycidol or 2-methyl glycidol, esters of glycidol or 2-methyl glycidol and an acid-functional vinyl monomer A20.

8. The reaction product of claim 7, wherein and vinyl aromatics A29 are styrene, vinyl toluene, and vinyl naphthalene and at least one epoxy-functional olefinically unsaturated monomer A3 selected from the group consisting of ethers of a hydroxy-functional vinyl monomer A22 with glycidol or 2-methyl glycidol, esters of glycidol or 2-methyl glycidol and an acid-functional vinyl monomer A20 which is an olefinically unsaturated aliphatic carboxylic acid having from three to twelve carbon atoms or an C1- to C6-alkyl half ester of an olefinically unsaturated dicarboxylic acid having from four to twelve carbon atoms.

9. The reaction product of claim 8, wherein and vinyl aromatics A29 are styrene, 2-vinly styrene, 4-vinyl toluene, 1-vinyl naphthalene or 2-vinyl naphthalene, or the mixtures of isomers of these.

10. The reaction product of claim 2, wherein the monomers A20 are acrylic and methacrylic acid, vinyl acetic acid, and crotonic and isocrotonic acids, and monomethyl and monoethyl maleinate or the corresponding fumarates, itaconates, mesaconates, or citraconates.

11. The reaction product of claim 7, wherein the epoxide-group containing monomers comprise olefinically unsaturated monoepoxides A31 derived from aliphatic dienes.

12. The reaction product of claim 7, wherein the amino-functional epoxy-amine adducts Ea have, on average, at least two amino groups per molecule and are derived from aromatic or aliphatic epoxide compounds E1 having at least two epoxide groups per molecule, and aliphatic or araliphatic amines E2 having at least one primary or secondary amino group per molecule.

13. The reaction product of claim 12, wherein the amounts of E1 and E2 are chosen such that the sum of the amount of substance n(OH) of hydroxyl groups and the amount of substance n(NH) of primary and secondary amino groups in the adduct Ea made from E1 and E2 that are reactive toward epoxide groups in Ae to the amount of substance of the said epoxide groups in Ae is at least 1 mol/mol.

14. A process to make the reaction product AE of claim 1 which comprises reacting aminofunctional vinyl copolymers Aa with multifunctional epoxy compounds Ee having, on average, at least two epoxide groups per molecule.

15. A process to make the reaction products AE of claim 6 which comprises reacting epoxy-functional vinyl copolymers Ae and amino-functional epoxy-amine adducts Ea having, on average, at least two amino groups per molecule.

* * * * *